Nov. 17, 1931.　　R. A. HEISING ET AL　　1,832,116
INDICATING SYSTEM
Filed March 28, 1923　　3 Sheets-Sheet 1
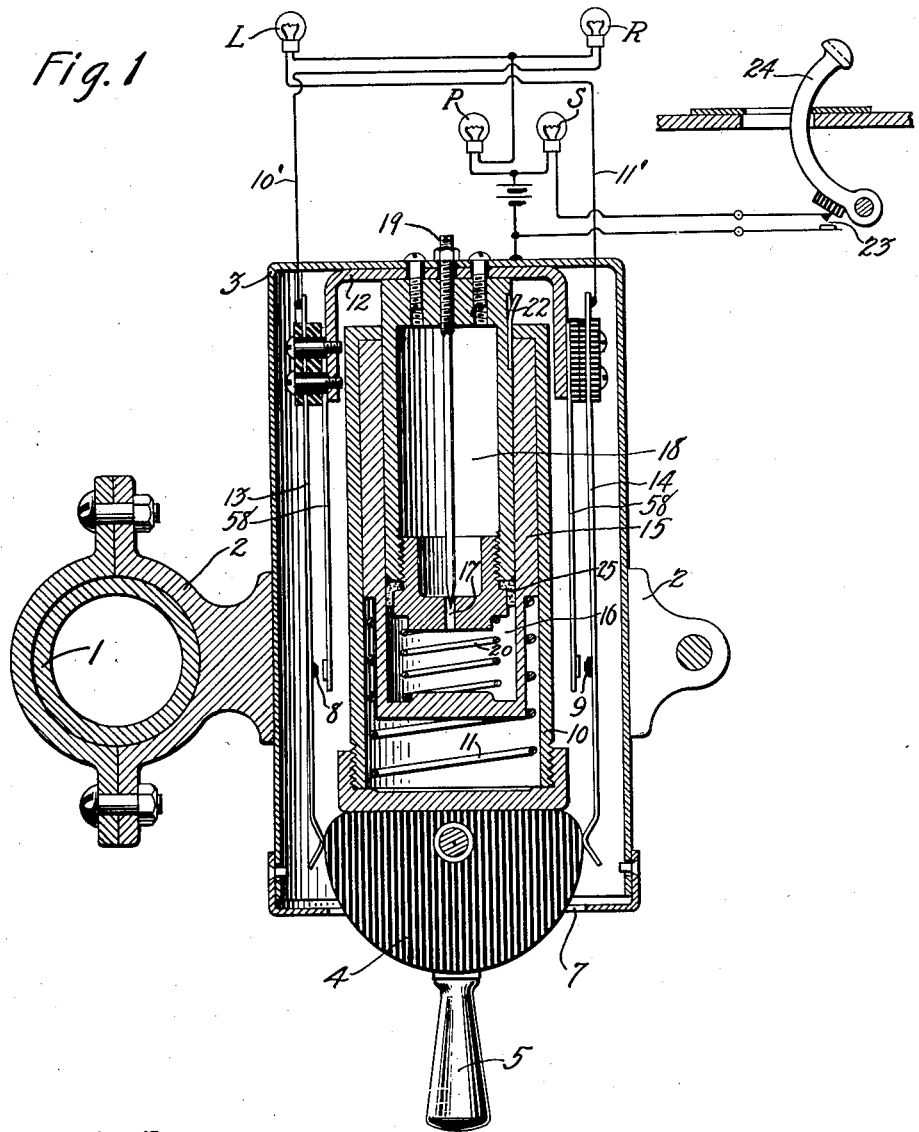
Fig.1
Fig.2
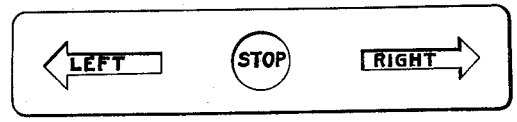
Inventors:
R. A. Heising
J. Kendall Nov. 17, 1931.  R. A. HEISING ET AL  1,832,116
INDICATING SYSTEM
Filed March 28, 1923   3 Sheets-Sheet 2
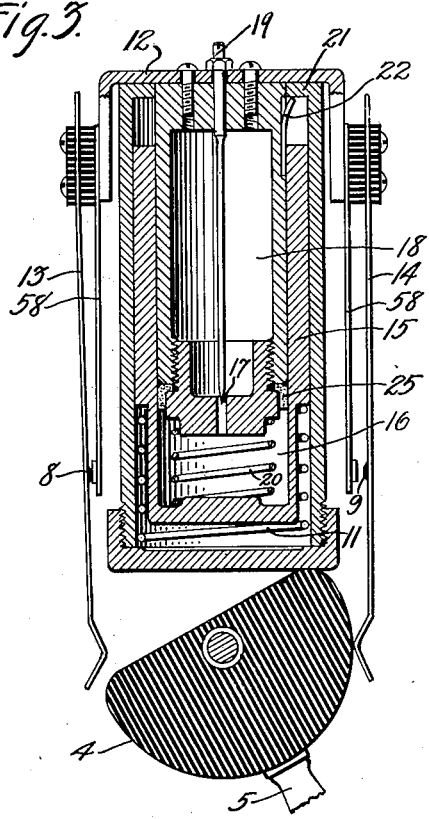
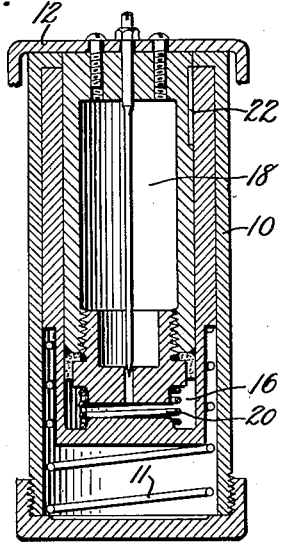
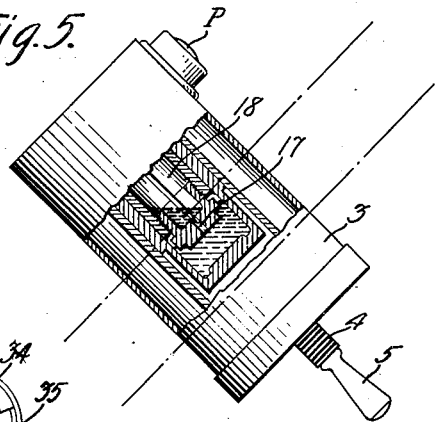
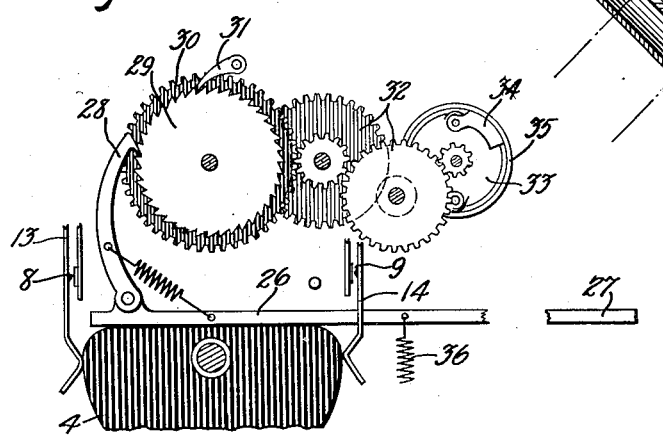
Inventors:
R. A. Heising
J. Kendall Nov. 17, 1931.   R. A. HEISING ET AL   1,832,116
INDICATING SYSTEM
Filed March 28, 1923   3 Sheets-Sheet 3

Inventors:
R. A. Heising
Kendall

Patented Nov. 17, 1931

1,832,116

UNITED STATES PATENT OFFICE

RAYMOND A. HEISING, OF MILLBURN, AND JAMES P. KENDALL, OF CRANFORD, NEW JERSEY

INDICATING SYSTEM

Application filed March 28, 1923. Serial No. 628,326.

This invention relates to indicating devices and more especially to direction indicators for moving vehicles.

An object of the invention is to provide for the giving of an indication by the operator on an indicating device and subsequent withdrawal of the indication after the expiration of a predetermined time without further attention on the part of the operator. A corollary object is to provide for the cancellation of the indication by the operator at any time prior to the expiration of the predetermined time.

The invention is exemplified in one embodiment thereof by an arrangement adapted to give simultaneous front and rear indications on automobiles of the direction about to be taken by the driver. A movable element arranged adjacent the driver, on the steering post, for example, may be moved to the right or the left to indicate the driver's intention to turn in one of those directions respectively. A signal holding mechanism comes into play and holds the indication for a predetermined time, for example, 20 seconds, after which the movable element is restored to normal and the signal canceled without further attention on the part of the operator who thus has his hands and feet free to attend to his driving controls except for the small instant of time necessary to operate the movable indicator control element.

Figure 7:
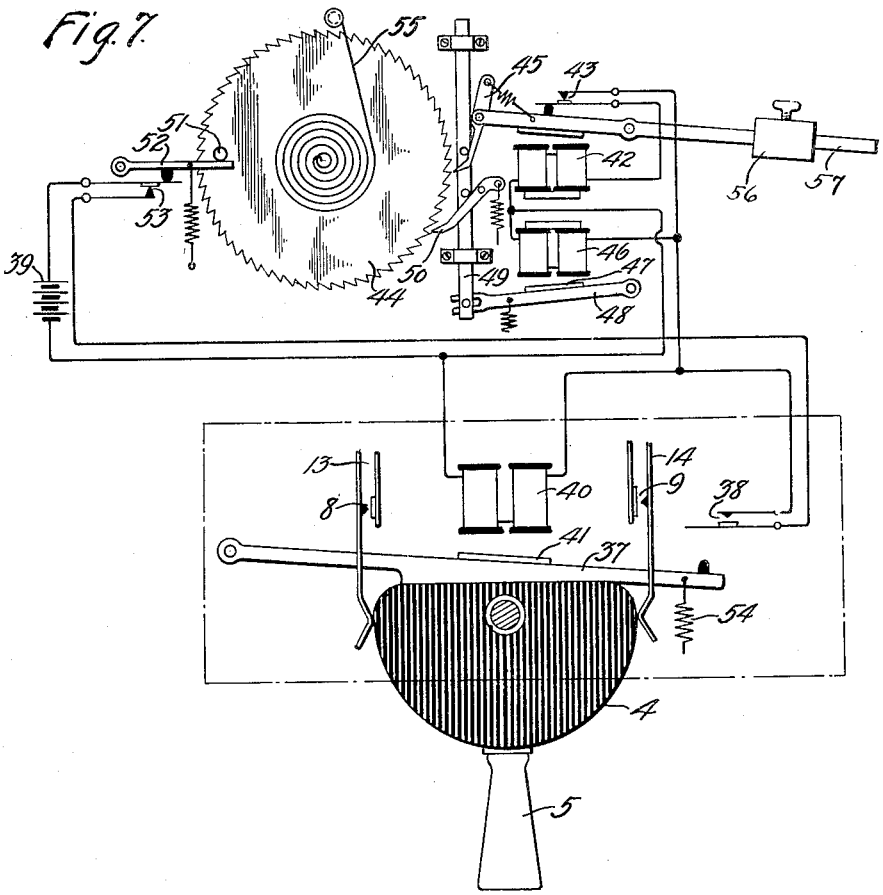

Several forms of the invention are hereinafter described in connection with the accompanying drawings wherein Fig. 1 is a sectional view of the device in unoperated position taken at right angles to the steering post, the signal lamp circuits being diagrammatically shown; Fig. 2 is a view of the rear signal board or plate; Fig. 3 is a corresponding sectional view of the same parts in operated position to give an indication, the circuits being omitted; Fig. 4 is a similar view of the position of the parts just before the indication is to be canceled and the parts restored to normal; Fig. 5 is a partial sectional view to indicate the position of the oil in the oil chamber of the dash-pot mechanism; Fig. 6 is a plan view of the operative parts of a modified form; Fig. 7 is a diagrammatic view of a further modification; and Figs. 8 to 11 inclusive, represent several of the many possible circuit arrangements which may be employed in a system of the present kind.

In Fig. 1, the lamp L is intended to give, when lighted, a left turn indication, lamp R, a right turn indication and Lamp S, a stop indication. They are placed in the usual manner to the rear of the correspondingly marked openings in the rear indicator plate shown in Fig. 2. Lamp P is a pilot light and its purpose is to show the operator whether his indicator lights are working properly. Lamp P is located in full view of the operator as shown in Fig. 5.

The direction indicator lamps are controlled by mechanism now about to be described which is mounted in any convenient position before the operator, as, for example, on the steering post 1. A bracket 2 attaches a casing 3 to the steering post. An operating element 4 bearing a handle 5 extends through the opening 7. The circuits of lamps R and L are normally open at contacts 8 and 9 which are carried by spring members 13 and 14 connected to conductors 10' and 11'. The flat rear surface of element 4 bears against a hollow cylindrical member which is kept in contact with the member 4 by the spring 11. The parts are so proportioned that in the position shown in Fig. 1 the spring 11 is not compressed or only slightly compressed.

To give a signal of his intention to turn to the right, the operator merely moves the handle 5 to the right. The cylinder 10 moves inwardly under the influence of the camming action of the element 4 until it strikes the base element 12. This limits the movement of the handle. To do this requires only a small fraction of a second. The spring 22 catches and holds the cylinder 10 by engaging the flange 21. The element 4 is borne upon by the spring 14 with sufficient force to hold it in position frictionally. As soon as spring 13 rides off the cam-shaped left hand corner of element 4, the contact 8 is closed and the lamp R lighted. The pilot lamp P is also lighted.

The position of the parts is then as shown in Fig. 3 because the release member 15 is held from inward movement by the oil or other fluid in the oil chamber 16. An adjustable port 17 allows the oil to escape into the reservoir 18. The effective size of opening of the port 17 may be established once for all in the manufacture of the device, but it may be made with an internal or external adjusting means. As shown, the adjusting screw 19 is threaded through the casing 12 and may be turned to regulate the port. It is contemplated that the oil will pass into the chamber 18 until the release element 15, having moved under the influence of the spring 11, has struck the internal annular flange 21. At this time, the position of the parts is as shown in Fig. 4.

In Fig. 4, the release element 15 has moved inwardly until the spring 22 is forced into its groove to release the cylinder 10. As soon as this happens, the spring 20 tends to restore the release element 15 to normal position which it does as rapidly as the oil can flow back into the chamber 16 from the reservoir 18. The spring 11 returns the element 10 and the cam member 4 to normal position. As soon as the operating cam 4 strikes the contact bearing spring 13 and breaks the contact 8, the lights R and P are extinguished.

It is contemplated that the time during which the light R is lighted will be about the average time necessary to execute a movement with the particular type of vehicle on which the device is used. With a rapidly moving car this might conveniently be 10 seconds and with a slow moving truck perhaps 20 seconds. By suitable adjustment of the port 17, the device may be made to hold the indication for any desired reasonable time. If the operator desires to cancel the indication before the expiration of the time for which the device is set he may do so by bringing the handle 5 to its normal central position. If he desires to give the opposite indication, this may be done at any time by moving the handle 5 over to the opposite position. When either lamp L or R is lighted, the lamp P will also be lighted and hence the operator has before him a positive indication that his direction indicators are operating properly since it will be almost impossible for the lamp P to light without lighting a lamp L or R. If either L or R is burned out, lamp P will not light. If lamp L or R should be short-circuited the voltage across lamp P will be sufficient to make it abnormally bright and perhaps burn it out almost immediately.

The stop indicator light S is controlled by a contact 23 which is closed by depressing the foot brake 24. In the circuit arrangement of Fig. 1, the lamp S will require twice the voltage of lamps L and R.

It is contemplated that the oil level in the reservoir be at all times above the port 17 as shown in Fig. 5, where the oil level is assumed to be shown at its lowest point as in the position of Fig. 1. When oil is forced into reservoir 18, the air will be compressed. Ordinarily this compression will be allowable as the chamber 18 may be made several times as large as the cubic contents of the maximum amount of oil forced into it. If desired, however, the pressure may be equalized by making a small opening through the casing from the highest part of the reservoir 18 to the open air. Furthermore, it is not necessary to use oil as the chamber 16 may be made air-tight and the port 17 adjusted so that air escaping through it will regulate the timing of the indications. However, the use of oil is preferred. Packing 25 serves to maintain the necessary tightness of the chamber 16.

The invention may be embodied in a great number of physical arrangements and many changes in form, size, detail and arrangements of parts may be made to fit diverse conditions or simplify the production or assembling of the apparatus.

One such modified form is shown in Fig. 6. The casing is omitted from Fig. 6, only the operative parts being shown. Operating member 5 when turned in either direction depresses the lever 26 mounted on a pivot 27. This causes the pawl 28 to ride over the ratchet 29 which may be held from backward motion by a pawl 31 if desired. Ratchet 29 is rigidly attached to gear wheel 30 which is connected through a chain of reduction gears 32 to a governor 33. The governor 33 is of a well-known rotary frictional type having friction shoes 34 bearing on a fixed annular member 35. The governor may also be any type of watch or clock escapement. When lever 26 is depressed to the full extent, the pawl 28 has ridden over several notches. Spring 36 tends to restore lever 26 but this action is delayed by the governor 33, thereby giving the desiring timing of the indication. The action of springs 13, 14 and their associated contacts 8, 9 is as in the arrangement of Fig. 1.

In Fig. 7 electrical time control means are employed. When lever 37 is depressed by the operating member 4, the contact 38 is closed. This closes a circuit from battery 39 through magnet 40 which attracts the armature 41 mounted on lever 37 and holds lever 37 in its operated position. At this time, of course, one or the other of lamps L or R will be lighted. Contact 38 also closes a circuit through stepping magnet which at once begins to operate. Stepping magnet 42 breaks its own circuit at contact 43 each time it steps the ratchet 44 around one notch by the pawl 45. Simultaneously with the energization of magnets 40 and 42, the magnet 46 is also energized. This attracts armature 47 and lifts lever 48 and slider 49 so that the pawl 45 is free to engage the ratchet 44 to turn it and pawl 50 engages the ratchet to hold it. Ratchet 44 continues to step around until the stop pin 51 has made almost a complete rotation and engages the under side of the pivoted bar 52 which holds the spring contact 53 closed. When thus engaged, the stop pin 51 raises bar 52 and allows contact 53 to open. At this time, magnets 40, 42 and 46 are simultaneously deenergized, bar 37 is restored by spring 54, pawls 45 and 50 are disengaged by slider 49 and the ratchet 44 is rotated to its original position by the spring 55.

The stepping magnet 42 is (as are the other parts) illustrated only diagrammatically and may have a speed and inertia adjusting means comprising a slider 56 on the lever 57. Stepping magnets are in common use in certain arts, for instance, automatic telephone switching systems and such types as are there employed may be used in the present instance.

A single magnet may operate the levers 37 and 48, thus replacing both magnets 40 and 46 but it is preferred to use separate magnets so that the elements enclosed in dotted lines may be mounted in one place, in a casing, on the steering post, for example, and the other elements are then concealed in another casing under the hood, seat, or elsewhere.

Figs. 8 to 11 illustrate various lighting circuit diagrams. Both front and rear indicator lights are preferred, the former to signal a traffic officer in front of the vehicle, the latter to give an indication in the rear. The front lights are marked RF and LF for right front and left front respectively, the rear lights are marked RR and LR for right rear and left rear respectively. P indicates the pilot light.

Figure 8:
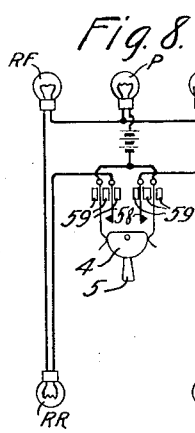

In Fig. 8, the elements 58 are insulated from ground. The member 4 may, in this instance, consist of conductive material, such as brass, without any danger of giving a false indication. A ground connection may be provided to keep the handle 5 and member 4 at ground potential at all times, if desired. When the handle is moved to the right, the lamps RF and RR will be lighted but when the handle is moved to the left, the left hand lamps LF and LR are lighted. In order to simplify the circuit diagrams of Figs. 8 to 11, the left hand lights are shown on the right and vice versa.

Figure 9:
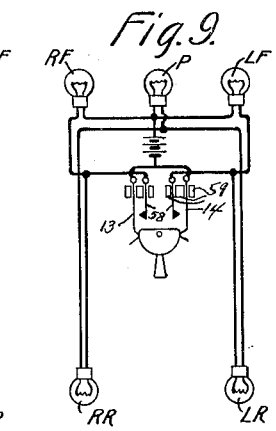

In Fig. 9, the pilot lamp P is in series with the rear lamps. The front lamps are connected to the battery by a separate circuit. The rear and pilot lamps may then be adapted to run on less voltage than the front lamps.

Figure 10:
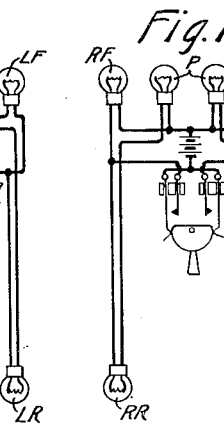

In Fig. 10, each rear lamp is provided with a different pilot lamp. These pilot lamps may be of different colors or otherwise distinctively characterized by positioning or some other means to effectively remind the operator which direction indication he has given and to permit him to readily observe when the indication is withdrawn.

Figure 11:
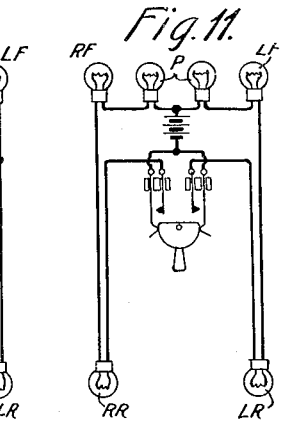

In Fig. 11 the front and rear lights are in series and are provided with a pilot light for each side.

In the circuit arrangements of Figs. 8 to 11, inclusive, the element 4 may be of conductive material. It may, however, be of insulating material as shown in Fig. 1. The members 13, 14 and 58 are both indicated as insulated from the frame by insulating material 59. However, it is not necessary to insulate members 13 and 14. If member 4 is of insulating material then the elements 13, 14 may be insulated and the elements 58 grounded as in Fig. 1. Numerous circuit arrangements and mechanical embodiments of the structural features of the invention are possible. Each circuit of Figs. 8 to 11 may be combined with a "stop" light as in Fig. 1. It is not necessary to use front lights. The invention may be used on any vehicle and indeed its utility is not limited to such use as it might be used for other purposes.

Important advantages are:—

(1) Operation by a single movement in the part of the operator.

(2) Automatic restoration to normal without the operator's attention.

(3) A positive indication to the operator that his signals are working.

(4) Immediate cancellation of the signal by the operator at any time with or without display of the opposite signal.

(5) Minimum distraction of the operator's attention and minimum consumption of his time.

Having described certain embodiments of the invention in detail, attention is now directed to the appended claims wherein are set forth the features believed to be novel which we desire to secure by Letters Patent.

What is claimed is:

1. A signal light controlling device comprising a pivoted finger element, a sliding member operated by movement thereof, a latch for holding said sliding member in operated position, a second sliding member normally positioned by a spring and set in motion by operation of said first named sliding member, a second spring designed to continue the motion of said second sliding member to release said latch, said second spring being positioned against said first named sliding member to return it to normal upon release of said latch.

2. In a signal light controlling device, three metallic members longitudinally movable with respect to one another, two springs arranged between different pairs of said members, a latch on one of said members arranged to engage another thereof, and means on a third member to release said latch.

3. In a circuit closing device, the combination of a plurality of sets of contacts and means controlled by flow of a fluid for determining the duration of closure of said sets of contacts, an actuating member, mechanism for selecting in accordance with the movement of said member and closing a selected one of said sets of contacts, said member being capable of actuation at any time independently of said means for the purpose of opening the closed contacts.

4. In a signal light controlling mechanism, a dash pot mechanism, a slidable member, a cam controlling two pairs of contacts in accordance with its direction of motion, said slidable member being cooperatively arranged to be moved by any motion of said cam, and means controlled by said dash pot mechanism to effect a restoring motion of said slidable member.

5. In a signal controlling device, a plurality of sets of contacts, mechanism to select and close one of said sets of contacts, a single element selective in accordance with its direction of motion to control said mechanism to select and close one of said sets of contacts, and liquid controlled mechanism determining the duration of closure of the selected set of contacts.

6. In a circuit closing device, an operating member, a driven member, a latch member, a release member, and a fluid filled chamber, connections whereby operation of said operating member displaces said driven member to a position where it becomes latched by said latch member and applies pressure to said fluid so that upon its expulsion from said chamber it causes said latch member to release said driven member, in combination with contacts closed by operation of said operating member and opened by release and restoration of said driven member.

7. In a circuit closing device, two sets of spring contact members, a cam member having surfaces directly contacting with one of each of said sets of members and functioning to change their normal condition when actuated, delayed action mechanism connected to said cam whereby displacement of said cam to change the normal condition of said members sets said delayed action mechanism into operation to restore said members to their normal position.

8. In a circuit closing device three relatively slidable members, a latch to fasten one of said members, when it is displaced, in its displaced position relatively fixed with respect to another of said members, and time delayed mechanism controlling the sliding movement of the third of said members to release said latch.

In witness whereof, we hereunto subscribe our names this 27 day of March A. D., 1923.

RAYMOND A. HEISING.
JAMES P. KENDALL.